(12) United States Patent
Oztaskent et al.

(10) Patent No.: US 11,924,507 B2
(45) Date of Patent: *Mar. 5, 2024

(54) ADAPTING SEARCH QUERY PROCESSING ACCORDING TO LOCALLY DETECTED VIDEO CONTENT CONSUMPTION

(71) Applicant: Google LLC, Mountain View, CA (US)

(72) Inventors: Ant Oztaskent, Sutton (GB); Yaroslav Volovich, Cambridge (GB); Ingrid McAulay Trollope, Richmond (GB)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/555,686

(22) Filed: Dec. 20, 2021

(65) Prior Publication Data

US 2022/0116682 A1 Apr. 14, 2022

Related U.S. Application Data

(63) Continuation of application No. 16/659,183, filed on Oct. 21, 2019, now Pat. No. 11,206,449, which is a
(Continued)

(51) Int. Cl.
*H04N 21/442* (2011.01)
*G06F 16/432* (2019.01)
(Continued)

(52) U.S. Cl.
CPC ..... *H04N 21/44213* (2013.01); *G06F 16/433* (2019.01); *G06F 16/7834* (2019.01);
(Continued)

(58) Field of Classification Search
CPC ....... H04N 21/44213; H04N 21/42203; H04N 21/4394; H04N 21/4722; H04N 21/482;
(Continued)

(56) References Cited

U.S. PATENT DOCUMENTS 9,547,647 B2 1/2017 Badaskar
2003/0028796 A1 2/2003 Roberts et al.
(Continued)

FOREIGN PATENT DOCUMENTS

CN 101309386 9/2009
CN 101673265 9/2012
(Continued)

OTHER PUBLICATIONS

Examination Report dated Jan. 23, 2020 in EP Patent Application No. 15797471.8.
(Continued)

*Primary Examiner* — Alazar Tilahun
(74) *Attorney, Agent, or Firm* — Gray Ice Higdon

(57) ABSTRACT

A process adapts user-initiated search queries. The process executes at a client device with a microphone. The process downloads audio fingerprints from a remote server for a plurality of video programs, and downloads information that correlates the audio fingerprint to the video programs. The audio fingerprints are preselected according to relevancy criteria, including stored user preferences and prior search queries by the user. The audio fingerprints and correlating information are stored locally. The process detects ambient sound using the microphone and computes one or more sample audio fingerprints from the detected ambient sound. The process matches a sample audio fingerprint to a locally stored audio fingerprint and uses the correlating information to identify a first video program corresponding to the matched sample audio fingerprint. The process then receives user input to initiate a search query. The process provides auto-complete suggestions for the search query based on the first video program.

21 Claims, 7 Drawing Sheets

Related U.S. Application Data continuation of application No. 15/892,270, filed on Feb. 8, 2018, now Pat. No. 10,455,281, which is a continuation of application No. 14/303,506, filed on Jun. 12, 2014, now Pat. No. 9,894,413.

(51) Int. Cl.
  *G06F 16/783* (2019.01)
  *H04N 21/422* (2011.01)
  *H04N 21/439* (2011.01)
  *H04N 21/4722* (2011.01)
  *H04N 21/482* (2011.01)
  *H04N 21/81* (2011.01)

(52) U.S. Cl.
  CPC ... *H04N 21/42203* (2013.01); *H04N 21/4394* (2013.01); *H04N 21/4722* (2013.01); *H04N 21/482* (2013.01); *H04N 21/4828* (2013.01); *H04N 21/8113* (2013.01)

(58) Field of Classification Search
  CPC ............ H04N 21/4828; H04N 21/8113; G06F 16/433; G06F 16/7834
  See application file for complete search history.

(56) References Cited

U.S. PATENT DOCUMENTS

| | | | |
|---|---|---|---|
| 2009/0006343 A1 | 1/2009 | Platt et al. | |
| 2010/0257165 A1 | 10/2010 | Jin et al. | |
| 2011/0078172 A1 | 3/2011 | LaJoie et al. | |
| 2011/0078729 A1 | 3/2011 | LaJoie et al. | |
| 2011/0264656 A1 | 10/2011 | Dumais et al. | |
| 2011/0289098 A1* | 11/2011 | Oztaskent | G06F 16/43 707/769 |
| 2012/0042343 A1 | 2/2012 | Laligand et al. | |
| 2012/0191231 A1 | 7/2012 | Wang | |
| 2012/0311074 A1 | 12/2012 | Arini et al. | |
| 2013/0111514 A1 | 5/2013 | Slavin et al. | |
| 2013/0160038 A1 | 6/2013 | Slaney et al. | |
| 2013/0204415 A1 | 8/2013 | Fregley et al. | |
| 2013/0290502 A1 | 10/2013 | Bilobrov et al. | |
| 2013/0308818 A1* | 11/2013 | MacIntosh | H04N 21/44008 382/100 |
| 2014/0059587 A1 | 2/2014 | Davis et al. | |
| 2014/0059608 A1 | 2/2014 | Beattie, Jr. et al. | |
| 2014/0280093 A1* | 9/2014 | Marantz | G06Q 30/0269 707/723 |

FOREIGN PATENT DOCUMENTS

| | | |
|---|---|---|
| CN | 102999493 | 7/2018 |
| EP | 2388721 | 11/2011 |
| WO | WO 2011046719 | 4/2011 |

OTHER PUBLICATIONS

International Search Report and Written Opinion dated Feb. 3, 2016 in International Patent Application No. PCT/US2015/035162.
Notice of Allowance dated Jun. 12, 2019 in U.S. Appl. No. 15/892,270.
Notice of Allowance dated Aug. 16, 2021 in U.S. Appl. No. 16/659,183.
Notice of Allowance dated Oct. 6, 2017 in U.S. Appl. No. 14/303,506.
Office Action dated Jan. 3, 2019 in CN Patent Application No. 201580031440.6.
Office Action dated Mar. 7, 2019 in U.S. Appl. No. 15/892,270.
Office Action dated Apr. 8, 2016 in U.S. Appl. No. 14/303,506.
Office Action dated Apr. 12, 2017 in U.S. Appl. No. 14/303,506.
Office Action dated Apr. 14, 2015 in U.S. Appl. No. 14/303,506.
Office Action dated Apr. 29, 2021 in U.S. Appl. No. 16/659,183.
Office Action dated May 5, 2020 in U.S. Appl. No. 16/659,183.
Office Action dated Oct. 6, 2016 in U.S. Appl. No. 14/303,506.
Office Action dated Oct. 8, 2015 in U.S. Appl. No. 14/303,506.
Office Action dated Oct. 26, 2018 in U.S. Appl. No. 15/892,270.
Office Action dated Dec. 2, 2020 in U.S. Appl. No. 16/659,183.

* cited by examiner

Program Profile 332

Broadcast Data 336

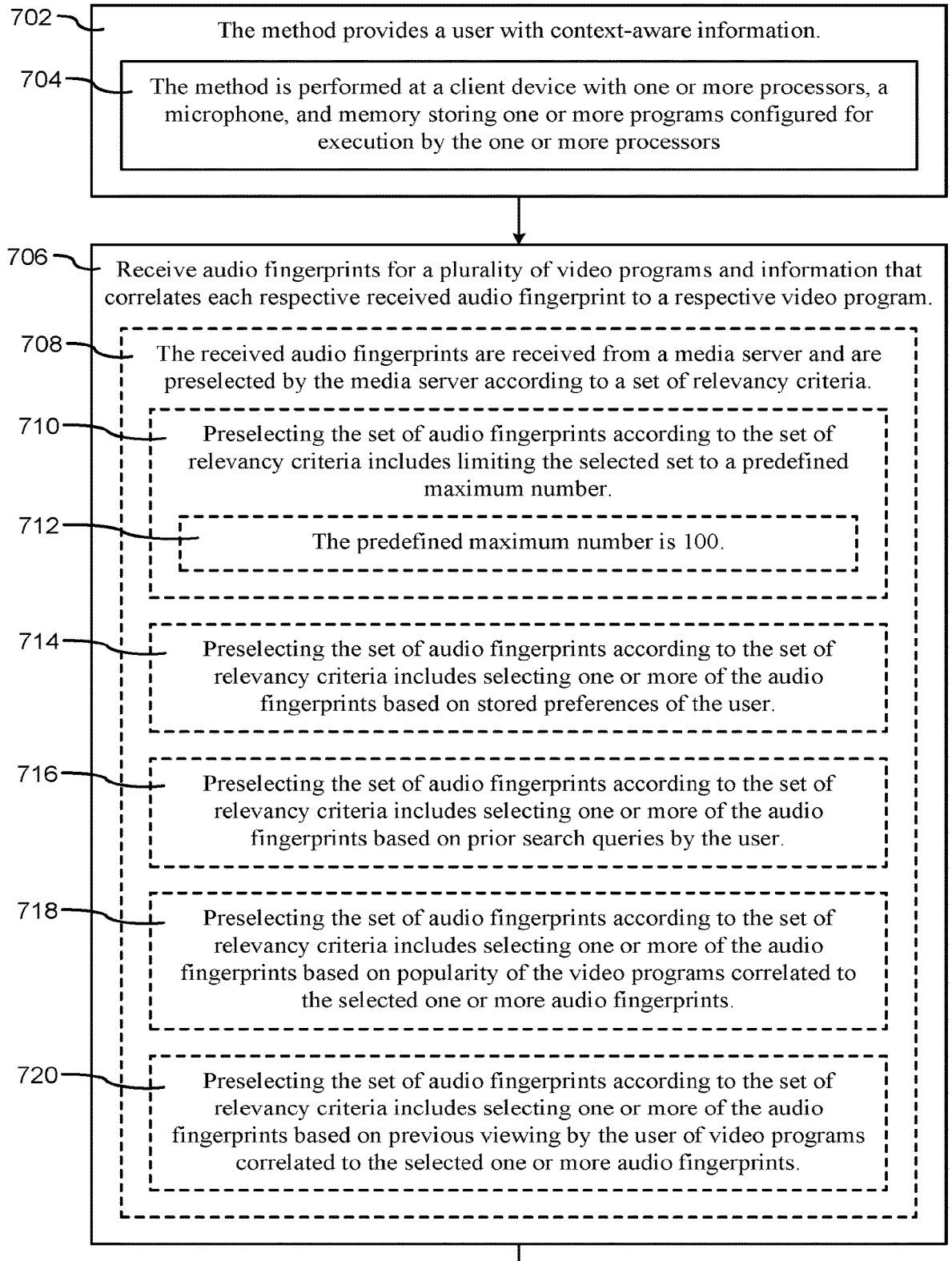

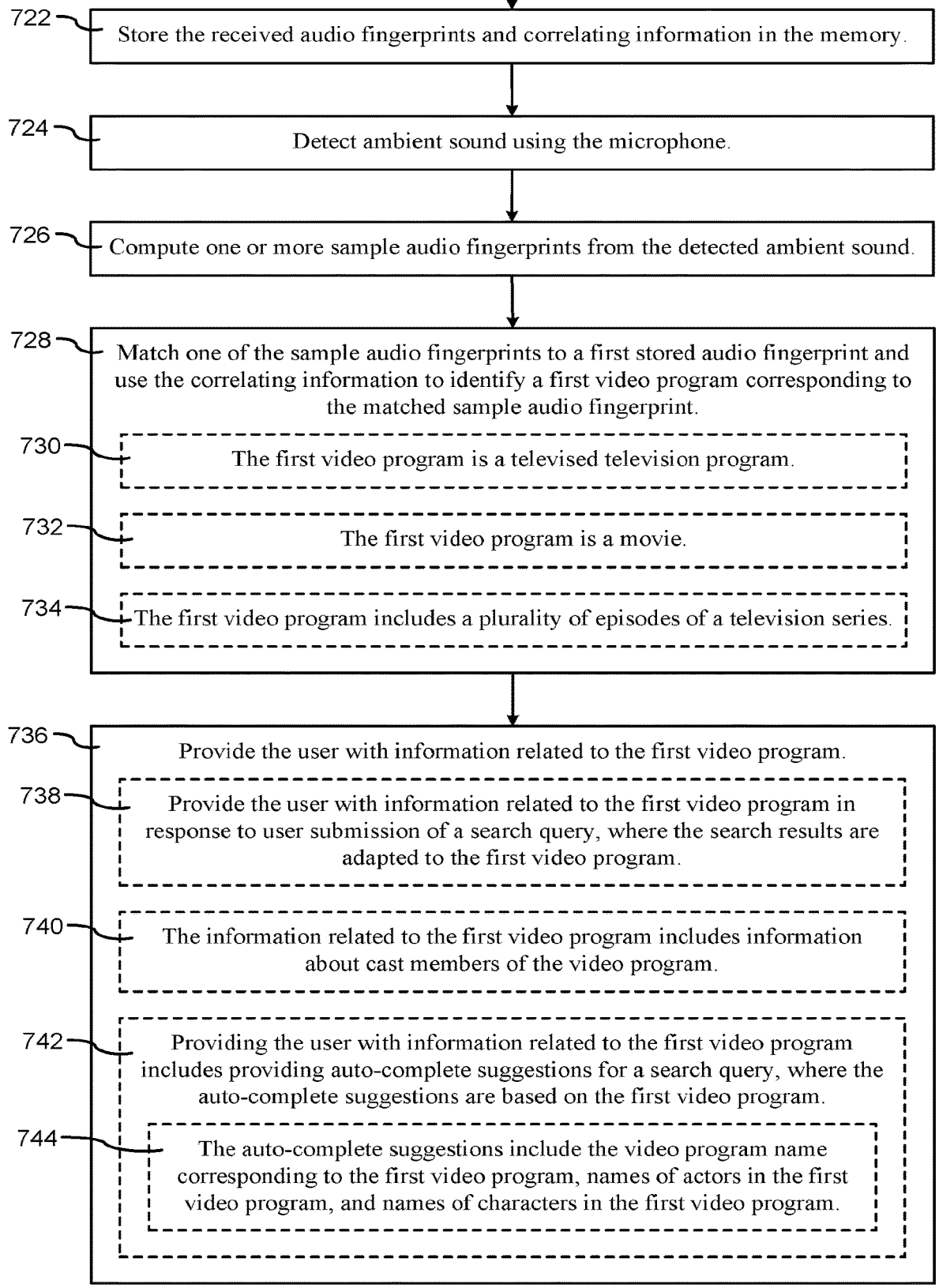

ADAPTING SEARCH QUERY PROCESSING ACCORDING TO LOCALLY DETECTED VIDEO CONTENT CONSUMPTION

CROSS-REFERENCE TO RELATED APPLICATIONS

This application is a continuation of U.S. patent application Ser. No. 16/659,183, filed Oct. 21, 2019, which is a continuation of U.S. patent application Ser. No. 15/892,270, filed Feb. 8, 2018, which is a continuation of U.S. patent application Ser. No. 14/303,506, filed Jun. 12, 2014, each of which is hereby incorporated by reference herein in its entirety.

TECHNICAL FIELDS

The disclosure relates generally to identifying video programs, and more specifically to providing a user with context-aware information based on identifying video content consumed by the user.

BACKGROUND

People watch a lot of television every day, and therefore many users submit search queries to a search engine while watching TV. Knowing the context that the user is in while making a search query can help provide better and more contextual results. For example, if the search engine knows what TV program a person is watching, the search engine can provide search results that are more relevant, or even predict what the user may search for while watching that content.

Some systems receive explicit information from a user to identify the user's context, but such systems are burdensome for users. Other systems provide an opt-in feature where users choose to have their ambient sounds monitored. When the feature is enabled by a user, the sounds are collected and sent to a server (e.g., once a minute or one every five minutes), where they are analyzed and compared against a large database of known audio from video programs. When a match is found, the server is able to identify what video program is being presented in the vicinity of the user. Such a system has several drawbacks. First, the frequent transmissions of data to the server consume lots of energy, and thus reduce battery life of the user's client device. Second, such a system is either burdensome (requiring periodic permission to continue tracking), or else creates privacy concerns by keeping the collection open too long.

SUMMARY

Disclosed implementations address the above deficiencies and other problems associated with providing a user with context-aware information. In some implementations, a media server finds repeated segments of audio across many episodes of the same show (e.g., a theme song or a jingle). The server computes audio fingerprints for these segments and sends the fingerprints to a user's client device (typically a mobile device, such as a smart phone). The user's client device then continuously (or periodically) performs local matching of those fingerprints on the user's client device against computed fingerprints of the ambient sound. In this way, sound at the client device is not transmitted to a server. This has several benefits. First, this provides greater respect for the user's privacy while simultaneously being less of a burden on the user. Second, because the computing and matching of fingerprints is done locally, there is no need to keep a network connection open, which results in less consumption of battery life. When the user issues a search query, the information regarding what television program the user is watching can be included, and thus the search engine is able to provide better context-aware search results.

In some implementations, a process runs on a server to identify a set of audio fingerprints that will be transmitted to a client device for matching. Rather than sending all possible audio fingerprints of video programs, the set transmitted to each client device is typically limited to a small number corresponding to video programs that a user is likely to watch.

The server collects audio content from live TV broadcasts (e.g., using a TV capture system) as well as on-demand video content libraries. The server identifies theme songs, jingles, and other audio samples that commonly occur in many episodes of the same TV show. For movies, a short sample (e.g., 30 seconds) may be taken from some point in the first 5 minutes. Some implementations select the point to take the sample based on the audio level at the time offset and/or how unique the content is (e.g., only samples that do not match any other TV show or movie are picked).

The server then computes audio fingerprints for these common audio samples, which will be compared with ambient audio from a microphone associated with a user's client device. Some implementations compute audio fingerprints using a format that minimizes the CPU usage of a client device to compute and compare audio fingerprints. In particular, some implementations use a format that minimizes the size of the audio fingerprints. Some implementations select small audio samples to reduce CPU usage.

There are many TV programs and many movies, but it would require excessive resources (e.g., network bandwidth, client device memory, client device CPU capacity, and client device battery) to download all of them and compare ambient sound at a client device against all of the possibilities. In some implementations, the server selects a subset of TV shows and movies whose fingerprints will be sent to a user's client device. Some implementations limit the audio fingerprints sent to a client device based on the number of independent video programs (a single video program has one or more audio fingerprints). In some implementations, the number of video programs for which audio fingerprints are transmitted is limited to a predetermined number (e.g., 100 or 200). Some implementations use various factors in the selection process, some of which are specific to an individual user, and some of which apply to a group of users (or all users).

In some implementations, the selection criteria include determining whether certain content (e.g., any episode of a video program) aired on TV during the previous week at a user's geographic location. In some implementations, the selection criteria include determining whether certain content was recently aired, and if so, the relative size of the viewership. In some implementations, the selection criteria include determining whether certain content is going to be aired on TV in the coming week. In some implementations, the selection criteria include determining whether the user watched the TV show before (e.g., a different episode of the same video program). In some implementations, the selection criteria include determining whether the user showed interest in that TV show before (e.g., searched for the show using a search engine, set a calendar reminder for the show, followed the show on a social networking site, or expressed interest in the show on a social networking site). In some implementations, the selection criteria use a user's personal profile. In some implementations, the selection criteria include determining popularity of video programs.

The server transmits the selected subset of audio fingerprints to a user's client device (e.g., pushed to the device or pulled by the device by an application running on the device). The process of selecting a subset of audio fingerprints and transmitting them to the user's device is typically done periodically (e.g., once a day or once each week). Fingerprints that already exist on the user's phone are generally not retransmitted. In some implementations, older audio fingerprints are discarded from a user's device when the corresponding video programs are no longer relevant.

At the user's client device, the microphone is opened by the user and kept open. In some implementations, the user's device continuously compares ambient audio captured by its microphone against the fingerprints that were received from the server. Typically this involves computing audio fingerprints for the ambient sound, and comparing those computed fingerprints to the received fingerprints. A match indicates that the user is near a television presenting the corresponding video program. The user is presumed to be watching the video program, which is generally true. The fact that the user is watching a certain TV show is stored on the user's device, and may be used to provide context-aware information to the user. In some implementations, the record indicating that the user is watching the show is stored "permanently" in a log on the device. In some implementations, records about watched shows are deleted after a certain period of time. In some implementations, records about watched shows are deleted N minutes after the end of the show, where N is a predefined number (e.g., 15 minutes, 30 minutes, or 60 minutes).

The context information about the user watching a specific video program can be used in various ways to provide the user with relevant information. In some implementations, when the user submits a search query, and the user is known to be watching a specific video program in the last M minutes (e.g., 30 minutes), that information may be used to provide an information card about the program (e.g., information about the program and its cast, with links to relevant search topics). That is, the client device includes the video program (e.g., program name or identifier) with the search query, and the server uses that knowledge to provide the information card.

In some implementations, the server responds by confirming that the user is watching the identified video program (e.g., "Are you watching Big Bang Theory?") and prompts the user to enter a rich experience. For example, the user may enable audio detection, after which audio fingerprint detection may be used to identify the exact episode and time offset that is being watched. This allows the server to provide more detailed and specific information.

In some implementations, knowledge of what program a user is watching can be used to provide search auto complete suggestions (e.g., auto complete show name, actor names, or character names).

In accordance with some implementations, a method executes at a client with one or more processors, a microphone, and memory. The memory stores one or more programs configured for execution by the one or more processors. The process receives audio fingerprints for a plurality of video programs and information that correlates each respective received audio fingerprint to a respective video program. In some instances, a video program has two or more correlated audio fingerprints. The process stores the received audio fingerprints and correlating information in the memory. The process detects ambient sound using the microphone, which may include the sound track of a video program being presented in the vicinity of the client device. The process computes one or more sample audio fingerprints from the detected ambient sound, and compares the computed audio fingerprints to the received audio fingerprints. In some instances, the process matches one of the sample audio fingerprints to a first stored audio fingerprint and uses the correlating information to identify a first video program corresponding to the matched sample audio fingerprint. The process then provides the user with information related to the first video program.

In some implementations, the received audio fingerprints are received from a media server and are preselected by the media server according to a set of relevancy criteria. In some implementations, preselecting the set of audio fingerprints according to the set of relevancy criteria includes limiting the selected set to a predefined maximum number (e.g., 100). In some implementations, preselecting the set of audio fingerprints according to the set of relevancy criteria includes selecting one or more of the audio fingerprints based on stored preferences of the user. In some implementations, preselecting the set of audio fingerprints according to the set of relevancy criteria includes selecting one or more of the audio fingerprints based on prior search queries by the user. In some implementations, preselecting the set of audio fingerprints according to the set of relevancy criteria includes selecting one or more of the audio fingerprints based on popularity of the video programs correlated to the selected one or more audio fingerprints. In some implementations, preselecting the set of audio fingerprints according to the set of relevancy criteria includes selecting one or more of the audio fingerprints based on previous viewing by the user of video programs correlated to the selected one or more audio fingerprints.

Thus methods and systems are provided that locally detect what video programs a user is watching, and provide context-aware information to the user based on knowledge of those programs.

BRIEF DESCRIPTION OF THE DRAWINGS

For a better understanding of the aforementioned implementations of the invention as well as additional implementations thereof, reference should be made to the Description of Implementations below, in conjunction with the following drawings in which like reference numerals refer to corresponding parts throughout the figures.

FIGS. 7A and 7B provide a flowchart of a process, performed at a client device, for providing context-aware information about video programs according to some implementations.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1:
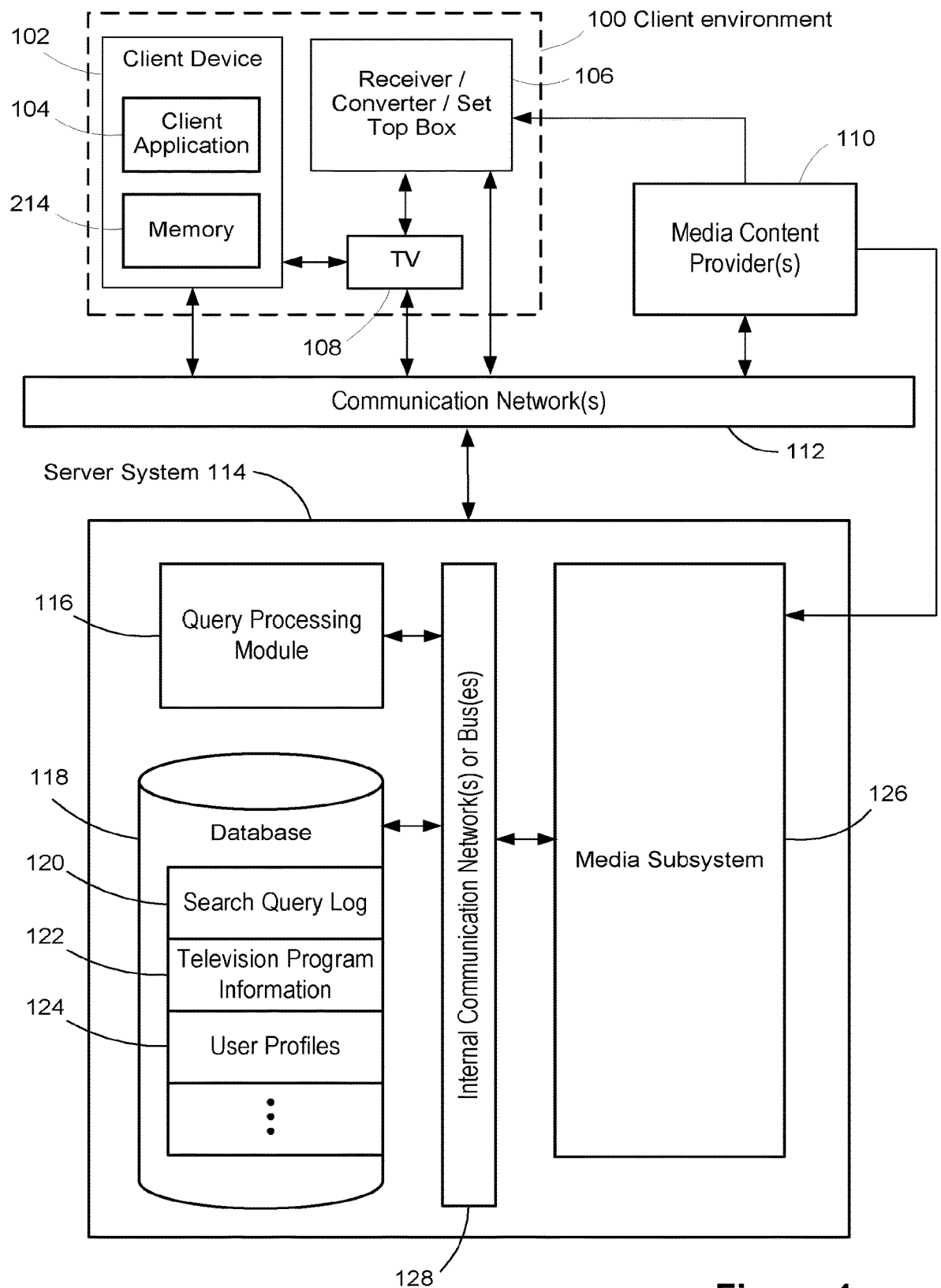
FIG. 1 illustrates a context in which some implementations operate.

FIG. 1 is a block diagram that illustrates the major components of some implementations. The various client devices 102 and servers 300 in server system 114 communicate over one or more networks 112 (such as the Internet). A client environment 100 includes a television 108, which is typically connected to a set top box 106 (or a receiver/converter). The set top box 106 receives media content from a content provider 110, such as a cable TV network, a satellite dish network, or broadcast over the airwaves. As illustrated in FIG. 1, in some cases the media content is transmitted through the communication networks 112.

The client environment 100 also includes one or more client devices 102, such as smart phones, tablet computers, laptop computers, or desktop computers. In the context here, the client device is typically in close proximity to the television 108. Running on the client device 102 is a client application 104. The client device 102 includes memory 214, as described in more detail below with respect to FIG. 2. In some implementations, the client application runs within a web browser 222. Although only a single client environment 100 is illustrated in FIG. 1, there are typically millions of client environments at any time. Different client environments 100 may use different media content providers 110, and may use varying combinations of client devices 102 and boxes 106 that function as receivers, converters, or set top boxes. Although FIG. 1 illustrates a single set top box 106, one of skill in the art would recognize that other environments could consist of a plurality of distinct electronic components, such as a separate receiver, a separate converter, and a separate set top box. Also, some or all of the functionality of the set top box 106 (or converter or receiver) may be integrated with the television 108.

The server system 114 includes a plurality of servers 300, and the servers 300 may be connected by an internal communication network or bus 128. The server system 114 includes a query processing module 116, which receives queries from users (e.g., from client devices 102) and returns responsive query results. The queries are tracked in a search query log 120 in a database 118.

The server system includes one or more databases 118. The data stored in the database 118 includes a search query log 120, which tracks each search query submitted by a user. In some implementations, the search query log is stored in an aggregated format to reduce the size of storage. The database may include television program information 122. The television program information 122 may include detailed information about each of the programs, including subtitles, as well as broadcast dates and times. Some of the information is described below with respect to FIGS. 4 and 5. In some implementations, the database 118 stores user profiles 124 for users, which may include preferences explicitly identified by a user, as well as preferences inferred based on submitted search queries or television viewing history.

The server system 114 also includes a media subsystem 126, which is described in more detail below with respect to FIGS. 3 and 6. Included in the media subsystem 126 are various modules to capture media content, compute audio fingerprints, and select audio fingerprints that are likely to be relevant for each user.

Figure 2:
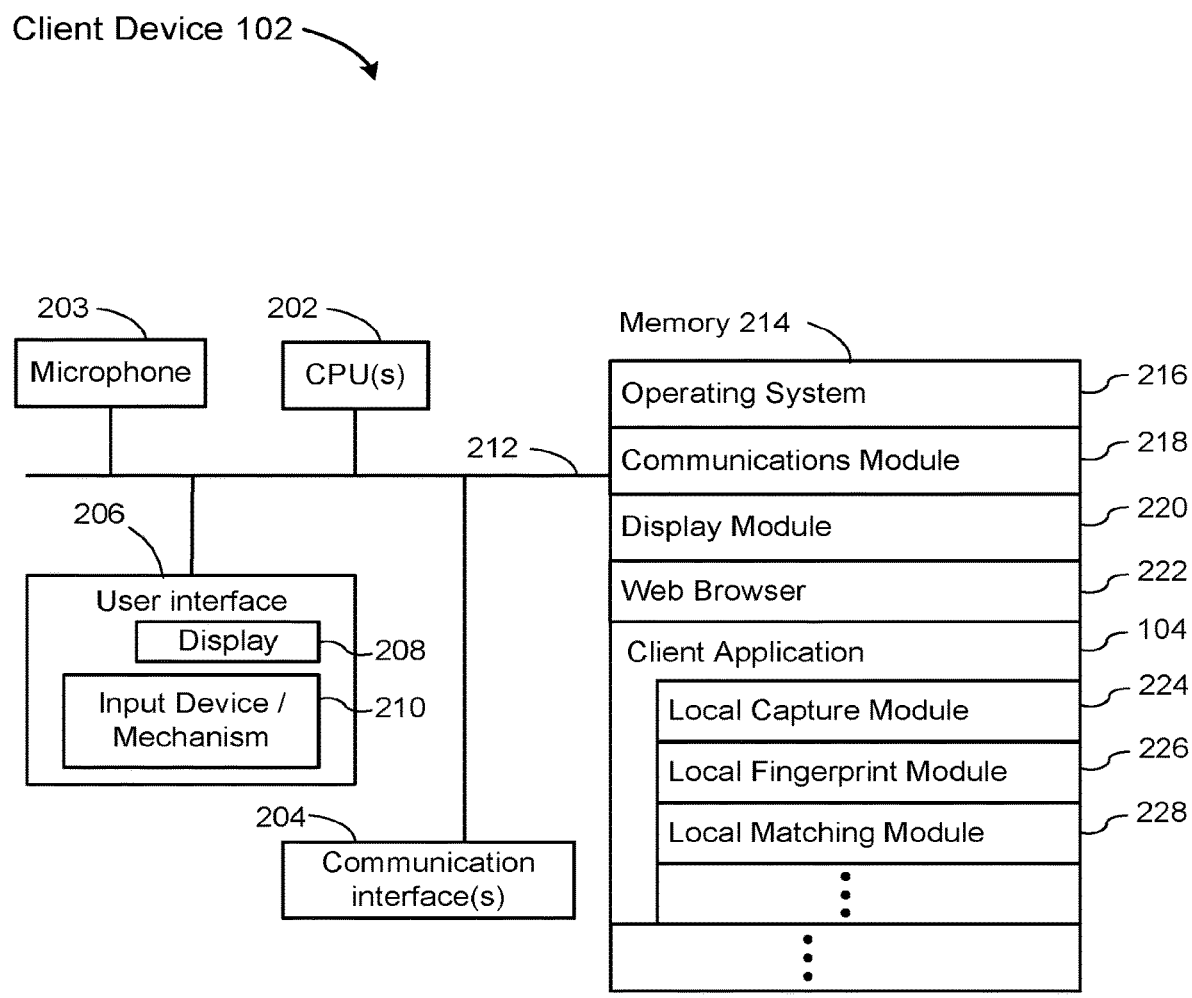
FIG. 2 is a block diagram of a client device according to some implementations.

FIG. 2 is a block diagram illustrating a client device 102 that a user uses in a client environment 100. A client device 102 typically includes one or more processing units (CPU's) 202 for executing modules, programs, or instructions stored in memory 214 and thereby performing processing operations; a microphone 203; one or more network or other communications interfaces 204; memory 214; and one or more communication buses 212 for interconnecting these components. The communication buses 212 may include circuitry (sometimes called a chipset) that interconnects and controls communications between system components. A client device 102 includes a user interface 206 comprising a display device 208 and one or more input devices or mechanisms 210. In some implementations, the input device/mechanism includes a keyboard and a mouse; in some implementations, the input device/mechanism includes a "soft" keyboard, which is displayed as needed on the display device 208, enabling a user to "press keys" that appear on the display 208.

In some implementations, the memory 214 includes high-speed random access memory, such as DRAM, SRAM, DDR RAM or other random access solid state memory devices. In some implementations, memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within memory 214, comprises a non-transitory computer readable storage medium. In some implementations, the memory 214, or the computer readable storage medium of memory 214, stores the following programs, modules, and data structures, or a subset thereof:

- an operating system 216, which includes procedures for handling various basic system services and for performing hardware dependent tasks;
- a communications module 218, which is used for connecting the client device 102 to other computers and devices via the one or more communication network interfaces 204 (wired or wireless) and one or more communication networks 112, such as the Internet, other wide area networks, local area networks, metropolitan area networks, and so on;
- a display module 220, which receives input from the one or more input devices 210, and generates user interface elements for display on the display device 208;
- a web browser 222, which enables a user to communicate over a network 112 (such as the Internet) with remote computers or devices;
- a client application 104, which may be used in conjunction with a television 108 to provide the user more context-aware information (e.g., information about television programs the user is watching). In some implementations, the client application 104 runs within the web browser 222. In some implementations, the client application 104 runs as a application separate from the web browser. The client application 104 is described in more detail with respect to FIG. 6; and
- in some implementations, the client application 104 includes one or more submodules for performing specific tasks. In some implementations, the client application 104 includes a local capture module 224, which captures ambient sounds using the microphone 203. In some implementations, the client application 104 includes a local fingerprint module 226, which takes the captured sounds, and computes audio fingerprints. In some implementations, the client application 104 includes a local matching module 228, which matches the computed audio fingerprints to audio fingerprints received from the media subsystem, thereby determining what video program the user is watching. These submodules are described in more detail below with respect to FIG. 6.

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 may store a subset of the modules and data structures identified above. Furthermore, the memory 214 may store additional modules or data structures not described above.

Although FIG. 2 shows a client device 102, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
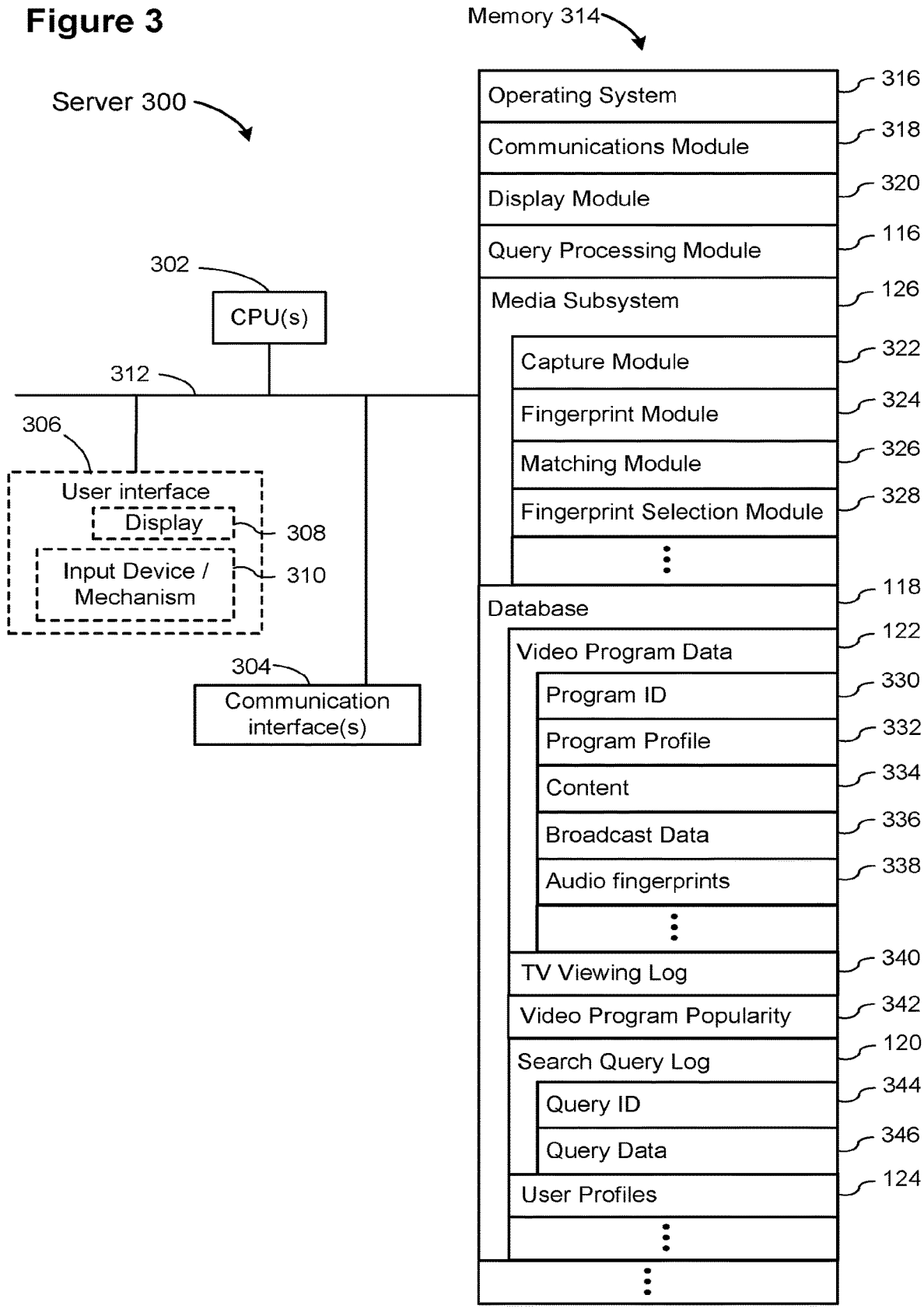
FIG. 3 is a block diagram of a server according to some implementations, which may be used in a server system.

FIG. 3 is a block diagram illustrating a server 300 that may be used in a server system 114. A typical server system includes many individual servers 300, which may be hundreds or thousands. A server 300 typically includes one or more processing units (CPU's) 302 for executing modules, programs, or instructions stored in the memory 314 and thereby performing processing operations; one or more network or other communications interfaces 304; memory 314; and one or more communication buses 312 for interconnecting these components. The communication buses 312 may include circuitry (sometimes called a chipset) that interconnects and controls communications between system components. In some implementations, a server 300 includes a user interface 306, which may include a display device 308 and one or more input devices 310, such as a keyboard and a mouse.

In some implementations, the memory 314 includes high-speed random access memory, such as DRAM, SRAM, DDR RAM or other random access solid state memory devices. In some implementations, the memory 314 includes non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternately the non-volatile memory device(s) within memory 314, comprises a non-transitory computer readable storage medium. In some implementations, the memory 314, or the computer readable storage medium of memory 314, stores the following programs, modules, and data structures, or a subset thereof:

- an operating system 316, which includes procedures for handling various basic system services and for performing hardware dependent tasks;
- a communications module 318, which is used for connecting the server 300 to other computers via the one or more communication network interfaces 304 (wired or wireless), an internal network or bus 128, or other communication networks 112, such as the Internet, other wide area networks, local area networks, metropolitan area networks, and so on;
- a display module 320, which receives input from one or more input devices 310, and generates user interface elements for display on a display device 308;
- a query processing module 116, which receives search queries from the client device 102, and returns responsive search results. In some implementations, each query is logged in the search query log 120;
- a media subsystem 126, which identifies various video programs that may be viewed by a user and transmits audio fingerprints of the video programs to a client device 102 corresponding to the user;
- in some implementations, the media subsystem 126 includes a capture module 322, which captures broadcast video programs and video programs stored in video libraries;
- in some implementations, the media subsystem includes a fingerprint module 324, which computes one or more audio fingerprints for each video program. In some implementations, an audio fingerprint is a small representation of an audio sample, and is relatively unique;
- in some implementations, the media subsystem 126 includes a matching module 326, which compares audio fingerprints to identify matches. In some implementations, the matching module uses fuzzy matching techniques;
- in some implementations, the media subsystem 126 includes a fingerprint selection module 328 (which may also be referred to as a video program selection module), which selects specific audio fingerprints and corresponding video programs based on relevance to a user. For example, there may be hundreds or thousands of TV programs that a user may watch (and many more movies), but a specific user is not equally likely to watch all of the possible video programs. The fingerprint selection module 328 identifies specific video programs (and their corresponding fingerprints) that are more likely to be watched by the user, and transmits the selected fingerprints to a user's client device 102. This is described in more detail with respect to FIG. 6; and
- one or more databases 118, which store various data used by the modules described herein.

Each of the above identified elements in FIG. 3 may be stored in one or more of the previously mentioned memory devices. Each executable program, module, or procedure corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 314 may store a subset of the modules and data structures identified above. Furthermore, the memory 314 may store additional modules or data structures not described above.

Although FIG. 3 illustrates a server 300, FIG. 3 is intended more as functional illustration of the various features that may be present in a set of one or more servers rather than as a structural schematic of the implementations described herein. In practice, and as recognized by those of ordinary skill in the art, items shown separately could be combined and some items could be separated. The actual number of servers used to implement these features, and how features are allocated among them, will vary from one implementation to another, and may depend in part on the amount of data traffic that the system must handle during peak usage periods as well as during average usage periods.

In some implementations, the database 118 stores video program data 122. Each video program includes a program ID 330, and various other information, which may be subdivided into separate data structures. In some implementations, the video program data 122 includes the video program content 334 (i.e., the video program itself), which includes both audio and video. In some implementations, the audio and video are stored separately. The video program data also includes one or more audio fingerprints 338 for each video program. Typically a single video program will have several stored audio fingerprints.

Figure 4:
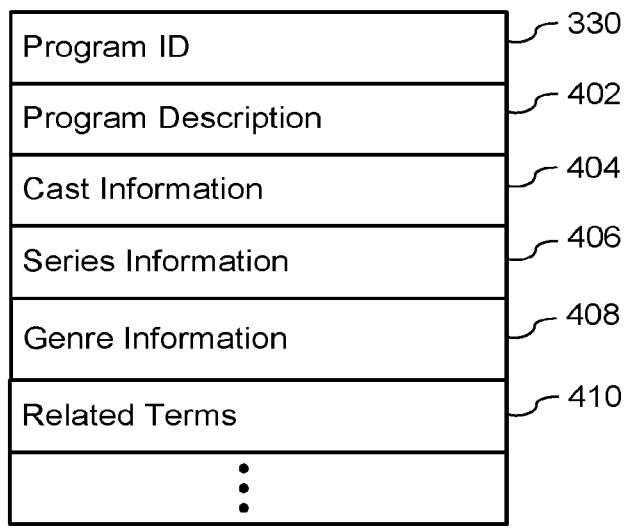
FIGS. 4 and 5 illustrate various skeletal data structures or tables used by some implementations.

In some implementations, the video program data for each program includes a program profile 332, which is described in more detail with respect to FIG. 4. The profile includes the program ID 330, which is a unique identifier for each video program. In some implementations, the profile 332 includes a program description 402, which may comprise one or more paragraphs that describe the program. The profile 332 may include cast information 404, which includes details about individual cast members or links to further information about the cast members (e.g., links to cast member web pages). For video programs that are part of a series, some implementations include series information 406 in the profile 332. In some implementations, the profile 332 includes genre information 408, which may include general information about the genre of the video program, and may provide links to additional information. In some implementations, the profile 332 includes related terms 410, which may include key terms that describe the video program or may identify terms that enable a user to identify related content.

Some implementations store information about when the video program has been or will be broadcast. Some implementations focus on video programs that are broadcast on a predefined schedule, and thus multiple viewers are viewing the same video program at the same time. Different techniques are applied to use video on demand (VOD) data, and may not use a broadcast data table 336.

Figure 5:
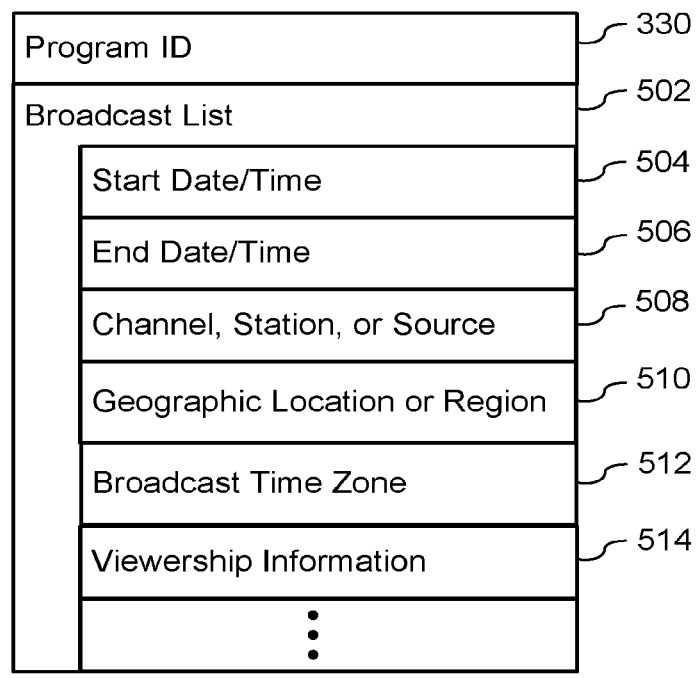

FIG. 5 illustrates a skeletal data structure for storing broadcast data 336. Broadcast data 336 includes a program ID 330 and a broadcast list 502, which identifies when the video program has or will be broadcast. In some implementations, each broadcast instance has a start time 504 and an end time 506. In some implementations, each broadcast instance includes a start time 504 and a duration. In some implementations, each broadcast instance includes information 508 that specifies the channel, station, or other source of the broadcast. In some implementations, each broadcast instance includes information 510 that specifies the geographic location or region where the broadcast occurred. In some implementations, the information 510 is a broadcast area. In some implementations, each broadcast instance stores the time zone 512 of the broadcast. For some video programs that have already been broadcast, viewership information 514 is collected and stored. The viewership information may include the number of viewers, the relative percent of viewers, and may be further subdivided based on demographic characteristics or geographic region.

In some implementations, the database 118 stores a TV viewing log, which identifies what programs a user has watched. This information may be provided to the server system 114 by the client application 104, or may be included in a search query submitted by the user. In some implementations, a user registers to have television viewing tracked (e.g., as part of a single source panel).

In some implementations, the database 118 stores calculated video program popularity data 342. As explained below in FIG. 6, this information may be used by the media subsystem 126 to select relevant video program fingerprints for each user.

In some implementations, the database 118 stores a search query log 120. In some implementations, each search query is assigned a unique query ID 344 (e.g., globally unique). In addition, the log stores various search query data 346. Each query includes a set of query terms, which may be parsed to eliminate punctuation. In some implementations, typographical errors are retained.

The query data 346 typically includes a timestamp that specifies when the query was issued. In some implementations, the timestamp is based on the user time zone, which is also stored. In other implementations, the timestamp represents a server generated timestamp indicating when the query was received. Some server systems 114 include one or more servers 300 that accurately manage timestamps in order to guarantee both accuracy of the data as well as sequential consistency. In some implementations, a server timestamp together with the user time zone (as well as knowing the server time zone) allows the server system to accurately know when each query was submitting according to the user's local time, and does not rely on the user's client device 102. In some implementations, the query data includes the user's IP address and the user's geographic location. The set of possible values for the user's geographic location typically corresponds to the same set of values for the geographic location or region 510 used for video broadcasts.

In some implementations, the database 118 stores user profiles 124. A user profile 124 may include data explicitly provided by a user (e.g., preferences for specific television programs or genres). In some implementations, user preferences are inferred based on television programs a user actually watches or based on submitted search queries.

Figure 6:
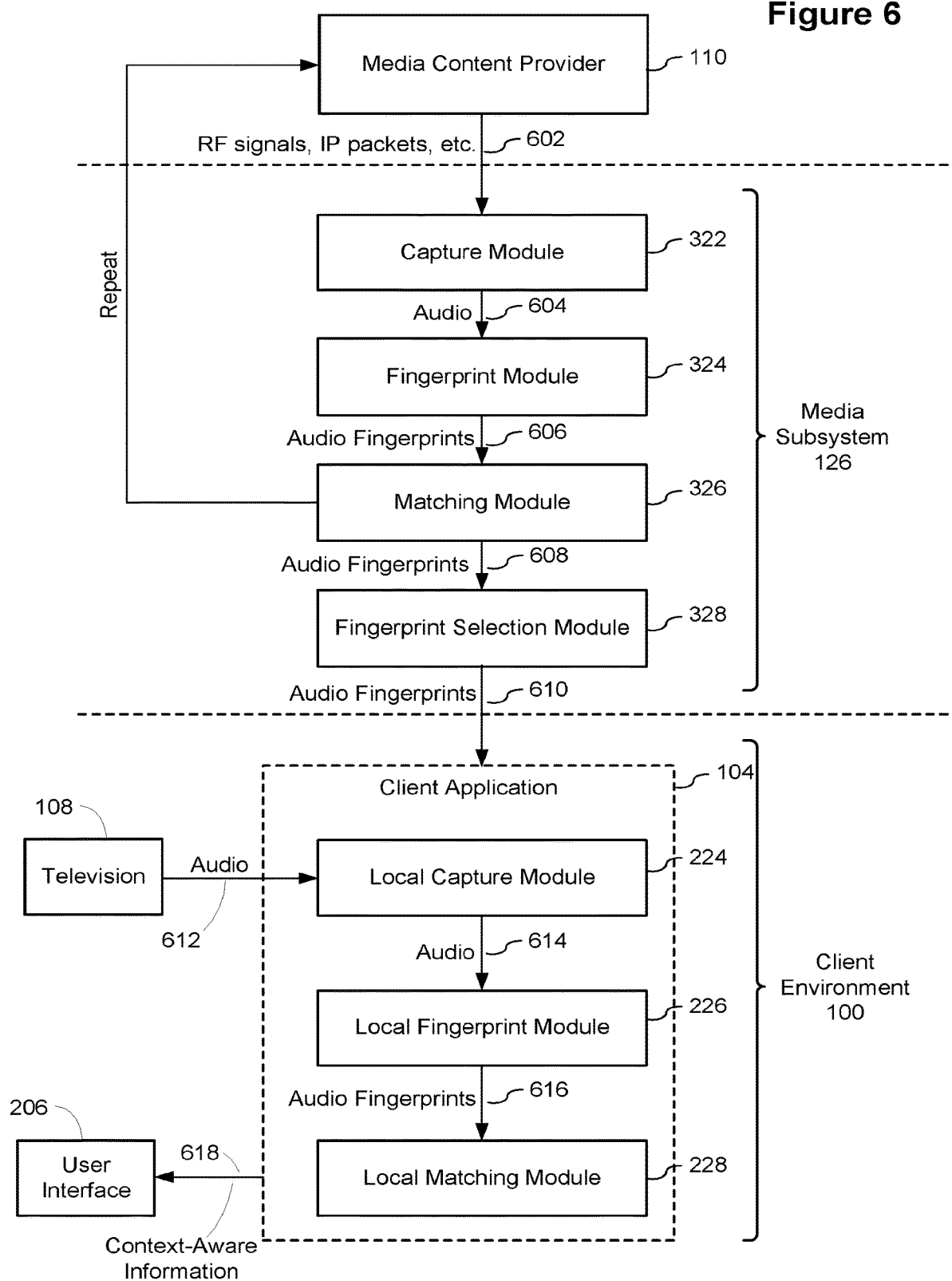
FIG. 6 a process flow for providing context-aware information in accordance with some implementations.

FIG. 6 illustrates a process of providing context-aware information to a user of a client device 102. A media content provider 110 provides (602) media content 334 to a capture module 322 within the media subsystem 126. The media content 334 may be provided in various forms, such as televised RF signals, electrical signals over a cable, IP packets over an IP network, or raw content from a video library. The capture module 322 receives the media content 334, and extracts audio signals, and forwards (604) the audio signals to a fingerprint module 324.

The fingerprint module 324 takes the audio and computes one or more audio fingerprints. For example, portions of a video program may be partitioned into 30-second segments, and an audio fingerprint computed for each of the segments. The audio fingerprints may be computed and stored in any known format, as long as the format is consistent with the format used by the local fingerprint module 226. The audio fingerprints computed by the fingerprint module 324 are sent (606) to the matching module 326 for review.

For each video program, it is useful to have an audio fingerprint that uniquely identifies the video program.

For a video program that includes multiple episodes (e.g., a TV series), the matching module 326 identifies theme music or jingles by comparing and matching audio fingerprints from multiple episodes. This matching process thus identifies audio portions that uniquely identify the video program (e.g., the theme song for American Idol). Note that the matching process does not necessarily know beforehand which broadcasts are episodes of the same series.

For a video program that is a movie, a different process is used because there are not multiple episodes to compare. In some implementations, multiple audio samples are taken from an early portion of the movie (e.g., ten 30-second segments from the first five minutes). From this set of samples, one is selected that is the most unique. Some implementations use a large indexed library of audio fingerprints in order to select audio fingerprints that are the most unique.

The process of capturing, computing audio fingerprints, and matching fingerprints to identify theme songs or theme music can be repeated many times. At some interval (e.g., once a day or once a week), the fingerprint selection module 328 takes (608) the matched audio fingerprints (and representative audio fingerprints for movies), and selects a subset to transmit to each user. The selection process may use various criteria, but generally limits the selected subset to a small number (e.g., 50 or 100). The selection criteria may use information about what shows have been or will be broadcast in the region where the user lives (e.g., based on the geographic location corresponding to the user's IP address), viewership or popularity information about the broadcast programs, the user's history of TV viewing, the user's history of submitted queries, information in a user profile, information from social media sites that illustrate a user's likes or dislikes, and so on. The selected subset of fingerprints (and information to correlate the fingerprints to video programs) is sent (610) to the client device 102 and received by the client application 104 in the client environment 100. The client application 104 stores the fingerprints and correlating information in its memory 214 (e.g., in non-volatile storage).

When permitted by the user, the client device 102 activates the microphone 203 and ambient sounds are received (612) by the local capture module 224. In some instances, some of the ambient sound comes from a television 108 that is near the client device 102. The captured audio is sent (614) to the local fingerprint module 226, which computes one or more fingerprints from the captured audio. In some implementations, the captured audio is broken into segments for fingerprinting (e.g., 30 second segments). The computed fingerprints are then sent (616) to the local matching module 228.

The local matching module 228 compares the audio fingerprints received from the local matching module to the fingerprints received from the media subsystem 126. A detected match indicates what show the user is watching, and that information is stored in the memory 214 of the client device.

Subsequently, context-aware information is provided (618) to the user interface 206 on the client device 102 in various ways. In some instances, when a user submits a query to the server system, the stored information about what video program the user is watching is included with the query so that the search engine can provide more relevant search results. In some instances, as a user is entering a search query, an auto-complete feature uses the information about what show the user is watching to complete words or phrases (e.g., the name of the show, the name of an actor or actress, the name of a character in the show, or the name of a significant entity in the show, such as the Golden Gate bridge or Mount Rushmore). In some implementations, the client application transmits the name of the program the user is watching to the server system even without a search query, and the user receives information about the program (e.g., more information about the video program or links to specific types of information).

FIGS. 7A and 7B provide a flowchart of a process 700, performed by a client device 102 for providing (702) context-aware information. The method is performed (704) by a client device with one or more processors, a microphone, and memory. The memory stores (704) programs configured for execution by the one or more processors.

The process receives (706) audio fingerprints for a plurality of video programs and information that correlates each respective received audio fingerprint to a respective video program. A video program can be an individual movie, a television series, a video documentary, and so on. For a series that includes multiple episodes, the term "video program" typically refers to the series instead of an individual episode in the series. Each audio fingerprint corresponds to a video program, and the correspondence is typically unique (i.e., an audio fingerprint identifies a single video program). However, there are generally multiple audio fingerprints for each video program. Commonly, the audio from a video program is divided into segments (e.g., 15 seconds, 30 seconds, or a minute), and a distinct audio fingerprint computed for each of the segments. One of skill in the art recognizes that there are many distinct formats for audio fingerprints and many distinct formulas or techniques that may be used to compute audio fingerprints. As disclosed herein, audio fingerprints may be computed at both a client device 102 as well as at a server system 114, so the formats used for the audio fingerprints at the client device 102 and at the server system 114 are the same or at least functionally compatible.

The received audio fingerprints correspond to video programs that the user of the client device is reasonably likely to watch in the near future (e.g., in the coming week). Here, reasonably likely may mean a 25% chance or higher, or greater than 10%.

In some implementations, the received audio fingerprints are received (708) from a media server (e.g., media subsystem 126) and are preselected by the media server according to a set of relevancy criteria. In some implementations, preselecting the set of audio fingerprints according to the set of relevancy criteria includes (710) limiting the selected set to a predefined maximum number. For example, in some implementations, the preselected number is (712) one hundred. Other implementations set a lower or higher limit (e.g., 50 or 200). In some implementations, the limit applies to video programs, but in other implementations, the limit applies to the number of computed audio fingerprints. For example, if each video program has approximately 5 audio fingerprints, then limiting the number of video programs to 100 is roughly the same as limiting the number of audio fingerprints to 500. Some implementations use a threshold probability of watching rather than a predefined maximum number. For example, select all audio fingerprints corresponding to video programs for which the estimated probability of watching is at least 10%.

Implementations use various selection criteria as described below. In some instances, an individual criterion is used by itself to identify a video program for inclusion in the preselected set. In other instances, multiple criteria are evaluated together to identify video programs for inclusion in the preselected set. In some instances, a score is computed for each video program based on the relevancy criteria (e.g., with each criterion contributing to an overall weighted score), and the scores enable selection of a specific number (e.g., the top 100) or those with scores exceeding a threshold value.

In some implementations, the relevancy criteria include (714) stored preferences of the user, which may be stored in a user profile 124. For example, a user may have preferences for (or against) specific programs, specific genres, or specific actors or actresses. In some instances, the user preferences are explicitly entered by the user. In some instances, user preferences may be inferred based on other data, such as previous programs viewed (e.g., as saved in a TV viewing log 340) or search queries previously submitted by the user (e.g., as saved in a search query log 120).

In some implementations, the relevancy criteria select (716) one or more of the audio fingerprints based on prior search queries by the user (e.g., in the search query log 120). For example, previous search queries may identify specific TV programs, the names of actors in a program, or the names of characters in a program.

In some implementations, video programs are selected (718) based on the popularity of the video programs. Typically, popularity of a video program is computed for smaller groups of people, such as people in specific geographic areas or with certain demographic characteristics. In some implementations, people are grouped based on other criteria, such as identified interests. In some implementations, popularity for a video program is computed for each individual user based on the popularity of the program among the user's circle of friends (e.g., in a social network).

In some implementations, video programs are selected (720) based on previous viewing by the user. For example, if a user has already viewed one or more episodes of a TV series, the user is more likely to watch additional episodes of the same TV series. Similarly, if a user has watched a specific movie, the user is more likely to watch related movies (or even the same movie), movies of the same genre, sequels, etc.

The process 700 stores (722) the received audio fingerprints and correlating information in the memory 214 of the client device 102 (e.g., non-volatile memory). The received audio fingerprints and correlating information may be appended to information previously received (e.g., receiving additional fingerprints daily or weekly). In some implementations, some of the older fingerprints are deleted after a period of non-use.

At some point, an application 104 opens up the microphone 203 on the client device 102 to detect (724) ambient sound. In some instances, detecting (724) ambient sounds occurs immediately after storing (722) the received audio fingerprints, but in other instances, detecting (724) may occur much later (e.g., hours or days). Note that the detecting (724) may start before storing the received audio fingerprints.

The local fingerprint module 226 computes (726) one or more sample audio fingerprints from the detected ambient sound. Each audio fingerprint typically corresponds to a short segment of time, such as 20 seconds or 30 seconds.

The local matching module 228 matches a sample audio fingerprint to a first stored audio fingerprint and uses the correlating information to identify a first video program corresponding to the matched sample audio fingerprint. In this way, the client application has identified what video program the user is watching without transmitting information or audio to an external server. In some instances, the first video program is (730) a televised television program. In some instances, the first video program is (732) a movie, which may be broadcast, streamed from an online source, or played from a physical medium, such as a DVD. In some instances, the video program includes (734) a plurality of episodes of a television series. In some instances, the matching process identifies the series, but not necessarily the episode.

At some point after the matching has occurred (e.g., 2 seconds later, a minute later, or half an hour later), the process 700 provides (736) the user with information related to the matched first video program. In some instances, the user is provided (738) with information related to the first video program in response to submission of a search query, where the search results are adapted to the first video program. When the user's search query is transmitted to the server system 114, the name of the matched video program (or an identifier of the video program) is included with the search query. Because of this, the query processing module 116 is aware of the query context, and thus able to provide more relevant search results. In some implementations, the search results include an information card about the matched video program and/or links to further information about the matched video program. In some implementations, the information related to the first video program includes (740) information about cast members of the video program or information about the characters in the video program.

In some implementations, providing the user with information related to the first video program includes providing (742) auto-complete suggestions for a search query that the user is entering. The auto-complete suggestions are (742) based on the first video program. In some instances, the auto-complete suggestions include (744) the video program name corresponding to the first video program, names of actors in the first video program, and/or names of characters in the first video program.

The terminology used in the description of the invention herein is for the purpose of describing particular implementations only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations described herein were chosen and described in order to best explain the principles of the invention and its practical applications, to thereby enable others skilled in the art to best utilize the invention and various implementations with various modifications as are suited to the particular use contemplated.

What is claimed is:

1. A method for identifying audio fingerprints, the method comprising:
   receiving, at a client device, a plurality of audio fingerprints that correspond to a plurality of media content items based on scheduled broadcast times;
   storing the plurality of audio fingerprints in a memory of the client device;
   detecting ambient sound using an audio input device of the client device;
   generating an audio fingerprint from the detected ambient sound;

comparing, at the client device, the audio fingerprint generated from the detected ambient sound to the plurality of audio fingerprints stored in the memory of the client device; and determining whether to transmit a received input to initiate a query to a server, wherein determining whether to transmit the received input to initiate a query to the server is based on whether the comparing indicates that the audio fingerprint matches one of the plurality of audio fingerprints stored in the memory of the client device.

2. The method of claim 1, further comprising downloading the plurality of audio fingerprints from a remote server for the plurality of media content items and information that correlates each respective downloaded audio fingerprint to a respective media content item.

3. The method of claim 2, wherein the downloaded audio fingerprints are preselected by the remote server according to a set of relevancy criteria including stored preferences of a user and prior search queries by the user.

4. The method of claim 2, further comprising:
computing sample audio fingerprints from the detected ambient sound; and
matching one of the sample audio fingerprints to a first audio fingerprint of the plurality of audio fingerprints and using the correlating information to identify a first media content item corresponding to the matched sample audio fingerprint.

5. The method of claim 4, further comprising presenting the user with information related to the first media content item.

6. The method of claim 5, wherein the information related to the first media content item includes auto-complete suggestions for the query.

7. The method of claim 1, further comprising discarding one or more of the plurality of audio fingerprints from the memory upon reaching a predetermined time.

8. A client device comprising:
an audio input device;
a memory; and
a hardware processor coupled to the memory that is programmed to:
receive a plurality of audio fingerprints that correspond to a plurality of media content items based on scheduled broadcast times;
store the plurality of audio fingerprints in the memory;
detect ambient sound using the audio input device;
generate an audio fingerprint from the detected ambient sound;
compare the audio fingerprint generated from the detected ambient sound to the plurality of audio fingerprints stored in the memory; and
determine whether to transmit a received input to initiate a query to a server based on whether the comparing indicates that the audio fingerprint matches one of the plurality of audio fingerprints stored in the memory.

9. The client device of claim 8, wherein the hardware processor is further programmed to download the plurality of audio fingerprints from a remote server for the plurality of media content items and information that correlates each respective downloaded audio fingerprint to a respective media content item.

10. The client device of claim 9, wherein the downloaded audio fingerprints are preselected by the remote server according to a set of relevancy criteria including stored preferences of a user and prior search queries by the user.

11. The client device of claim 9, wherein the hardware processor is further programmed to:
compute sample audio fingerprints from the detected ambient sound; and
match one of the sample audio fingerprints to a first audio fingerprint of the plurality of audio fingerprints and using the correlating information to identify a first media content item corresponding to the matched sample audio fingerprint.

12. The client device of claim 11, wherein the hardware processor is further programmed to present the user with information related to the first media content item.

13. The client device of claim 12, wherein the information related to the first media content item includes auto-complete suggestions for the query.

14. The client device of claim 8, wherein the hardware processor is further programmed to discard one or more of the plurality of audio fingerprints from the memory upon reaching a predetermined time.

15. A non-transitory computer-readable medium containing computer executable instructions that, when executed by a processor, cause the processor to perform a method for identifying audio fingerprints, the method comprising:
receiving, at a client device, a plurality of audio fingerprints that correspond to a plurality of media content items based on scheduled broadcast times;
storing the plurality of audio fingerprints in a memory of the client device;
detecting ambient sound using an audio input device of the client device;
generating an audio fingerprint from the detected ambient sound;
comparing, at the client device, the audio fingerprint generated from the detected ambient sound to the plurality of audio fingerprints stored in the memory of the client device; and
determining whether to transmit a received input to initiate a query to a server, wherein determining whether to transmit the received input to initiate a query to the server is based on whether the comparing indicates that the audio fingerprint matches one of the plurality of audio fingerprints stored in the memory of the client device.

16. The non-transitory computer-readable medium of claim 15, wherein the method further comprises downloading the plurality of audio fingerprints from a remote server for the plurality of media content items and information that correlates each respective downloaded audio fingerprint to a respective media content item.

17. The non-transitory computer-readable medium of claim 16, wherein the downloaded audio fingerprints are preselected by the remote server according to a set of relevancy criteria including stored preferences of a user and prior search queries by the user.

18. The non-transitory computer-readable medium of claim 16, wherein the method further comprises:
computing sample audio fingerprints from the detected ambient sound; and
matching one of the sample audio fingerprints to a first audio fingerprint of the plurality of audio fingerprints and using the correlating information to identify a first media content item corresponding to the matched sample audio fingerprint.

19. The non-transitory computer-readable medium of claim 18, wherein the method further comprises presenting the user with information related to the first media content item.

20. The non-transitory computer-readable medium of claim 19, wherein the information related to the first media content item includes auto-complete suggestions for the query.

21. The non-transitory computer-readable medium of claim 15, wherein the method further comprises discarding one or more of the plurality of audio fingerprints from the memory upon reaching a predetermined time.

\* \* \* \* \*